United States Patent
Neumann et al.

(10) Patent No.: US 6,895,190 B1
(45) Date of Patent: May 17, 2005

(54) SWITCHABLE BANDWIDTH LOWPASS FILTER

(75) Inventors: Richard L. Neumann, Louisville, CO (US); James E. Myers, Northglenn, CO (US)

(73) Assignee: Picolight, Incorporated, Boulder, CO (US)

( * ) Notice: Subject to any disclaimer, the term of this patent is extended or adjusted under 35 U.S.C. 154(b) by 0 days.

(21) Appl. No.: 09/579,470

(22) Filed: May 26, 2000

(51) Int. Cl.[7] ............................................. H04B 10/06
(52) U.S. Cl. .................. 398/202; 359/135; 359/140; 359/141; 359/159; 359/164; 359/206; 359/208; 359/209; 455/340; 455/188; 455/190; 333/174; 333/205; 333/207; 333/175; 333/176; 250/214 LS; 250/214.1; 250/214 SW; 250/214 R
(58) Field of Search ................................ 398/202, 135, 398/206, 208, 209, 140, 141, 159, 164; 455/340, 188, 190; 333/174, 205, 207, 175, 176; 250/214 LS, 214.1, 214 SW, 214 R

(56) References Cited

U.S. PATENT DOCUMENTS

| 4,453,145 | A | 6/1984 | Schuster |
| 4,499,609 | A | 2/1985 | Muska |
| 4,809,286 | A | 2/1989 | Kollanyi et al. |
| 4,962,348 | A | 10/1990 | Edwards |
| 5,619,365 | A | 4/1997 | Rhoads et al. |
| 5,953,690 | A | 9/1999 | Lenon et al. |
| 5,999,042 | A | 12/1999 | Hemdal et al. |

*Primary Examiner*—Hanh Phan
(74) *Attorney, Agent, or Firm*—Jagtiani + Guttag

(57) ABSTRACT

A novel transceiver is provided which allow for either a transmitter or receiver to be dynamically switched between two different frequency bands by use of a novel switchable lowpass filter.

42 Claims, 4 Drawing Sheets

SWITCHABLE BANDWIDTH LOWPASS FILTER

CROSS-REFERENCE TO RELATED APPLICATIONS

This application makes reference to the following U.S. Patent Applications. The first application is U.S. application Ser. No. 09/323,204, entitled "Electro-Opto-Mechanical Assembly for Coupling a Light Source or Receiver to an Optical Waveguide," filed Jun. 1, 1999. The second application is U.S. application Ser. No. 09/281,982, entitled "Fiber Optic Ferrule," filed Mar. 31, 1999. The third application is U.S. application Ser. No. 09/389,220, entitled "Enclosure for Optical Subassembly Having Mechanical Alignment Features," filed Sep. 3, 1999. These applications are hereby incorporated by reference.

BACKGROUND OF THE INVENTION

1. Field of the Invention

The present invention relates generally to electronic filters, and more particularly to a switchable bandwidth lowpass filter as may be used in conjunction with controlling a fiber optic transceiver.

2. Description of the Prior Art

It is desirable to have a fiberoptic transmitter or receiver whose bandwidth can be varied by a control input, to match the frequency characteristics of more than one fiberoptic transmitter ($T_x$) or receiver ($R_x$) in communication with the first $R_x$ or $T_x$. In prior art devices, the receivers or transmitters are designed to have predetermined frequency characteristic that is not dynamically adjustable. This results in devices that are specific to particular applications and are not universal in nature. In addition, these devices do not allow for a migration path to higher bandwidth systems without replacing the receiver and/or transmitter.

Filters, such as simple RC filters, for example, are sometimes used in applications where it is desirable to change the characteristics of a $T_x$ or $R_x$. For example, a particular filter may work best with a fast time constant under certain circumstances, under different circumstances, a relatively slow time constant may be required. Either the filter's resistance or the capacitance may be varied, for example, to change the characteristics of these filters.

There is a need to provide a simple, yet efficient, circuit for providing bandwidth swichability to fiberoptic transceivers.

SUMMARY OF THE INVENTION

It is therefore an object of the present invention to provide a circuit that will provide controllable bandwidth characteristics to a fiberoptic transceiver.

It is a further object to provide a circuit that uses a few small, low cost components.

It is yet another object to provide fiberoptic transceivers that may be used in multiple applications because of the passband associated with these transceivers may be varied by a control input.

It is yet another object to provide a transceiver that may be modified to accept or emit data having a plurality of frequency ranges.

In all of the above embodiments, it is an object to provide a circuit that uses a few small, low cost components.

It is yet another object of the invention to provide a filter circuit which may be continuously tuned over a range of frequency bands.

Finally, it is an object of the invention to provide a filter circuit which may be utilized to switch between at least two different frequency bands.

According to one broad aspect of the present invention, there is provided a switchable optoelectronic receiver having at least two different operational data bandwidths, and a means for selecting between the two bandwidths.

According to another broad aspect of the invention, there is provided a switchable optoelectronic transmitter having at least two different emission bandwidths, and a means for selecting between the two bandwidths.

According to another broad aspect of the invention, there is provided a switchable optoelectronic transceiver having at least two different operational data bandwidths, and a means for selecting between the two bandwidths.

According to another broad aspect of the invention, there is provided a switchable optoelectronic receiver having at least two different operational data bandwidths, a means for selecting between the two bandwidths, and means for autodetecting the operational data bandwidth, wherein the means for autodetecting comprises a first and second data channel, the first data channel input to the means for selecting between the two bandwidths, the second data channel input to a pre-amplifier and filter and then to a detector/rectifier/comparator to generate a control signal, the control signal provided to the means for selecting between the two bandwidths.

According to another broad aspect of the invention, there is provided a switchable optoelectronic transmitter having at least two different operational data bandwidths, a means for selecting between the two bandwidths, and means for autodetecting the operational data bandwidth, wherein the means for autodetecting comprises a first and second data channel, the first data channel input to the means for selecting between the two bandwidths, the second data channel input to a pre-amplifier and filter and then to a detector/rectifier/comparator to generate a control signal, the control signal provided to the means for selecting between the two bandwidths.

According to another broad aspect of the invention, there is provided a switchable optoelectronic transceiver having at least two different operational data bandwidths, a means for selecting between the two bandwidths, and means for autodetecting the operational data bandwidth, wherein the means for autodetecting comprises a first and second data channel, the first data channel input to the means for selecting between the two bandwidths, the second data channel input to a pre-amplifier and filter and then to a detector/rectifier/comparator to generate a control signal, the control signal provided to the means for selecting between the two bandwidths.

Other objects and features of the present invention will be apparent from the following detailed description of the preferred embodiment.

BRIEF DESCRIPTION OF THE DRAWINGS

The invention will be described in conjunction with the accompanying drawings, in which.

DETAILED DESCRIPTION OF THE PREFERRED EMBODIMENT

Figure 1:
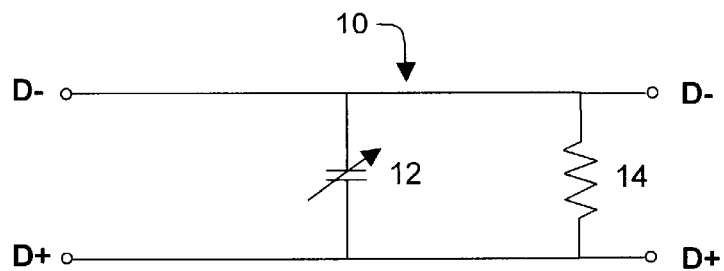
FIG. 1 is a schematic diagram of a variable capacitance bandwidth switchable filter.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

The term "switching means" is defined as any means that allows for the selective insertion of electronic components into a circuit. Examples of switching means include, but are not limited to a single-pole switch, a diode, a transistor, pin diode, and relay.

The term "transistor" means a device having a bi-directional current flow, where the current flow is controllable in at least one direction by an input signal. Examples of transistors include, but are not limited to, junction transistors, field effect transistors, reverse-biased field effect transistors, uni-junction transistors, and metal-oxide-semiconductor transistors.

The term "optoelectronic transmitter" means any device that receives an electrical signal and converts it into an optical signal.

The term "optoelectronic receiver" means any device that receives an optical signal and converts it into an electric signal.

The term "transceiver" means any electrical or optical device for receiving and/or sending an electrical or optical signal.

The term "optoelectronic transceiver" means an optoelectronic transmitter and an optoelectronic receiver that, if combined, form an optoelectronic transceiver.

Description

Basically, the invention seeks to solve the problem of providing, at a small expense, a simply constructed filter which may be tuned over a wide frequency range and which maintains relative frequency characteristics, such as sharp selectivity at the passband limit, which may be tuned via an external or internal control signal to a number of desirable frequency characteristics, and may be tuned to optimize receiver characteristics such as sensitivity, spurious signal rejection, etc., depending on the application.

In particular, the invention may allow for equipment upgrades without the necessity for purchasing new transceivers. For example, a switchable bandwidth transceiver may be used at its lower frequency in a particular system such as a router or storage area network. When that system is later upgraded to use higher speed interconnects using high-speed transceivers, instead of purchasing a new, higher speed transceiver, the system user can still use the switchable bandwidth transceiver operation at the higher speed. Exemplary speeds are approximately 1 Gigabit per second for the lower speed and 2 Gigabits per second for the higher speed. In particular, Fibre Channel transceivers for storage area networks presently operate at 1.0625 Gb/s±100 ppm and are moving to speed of 2.125 Gb/s±100 ppm. The switchable optoelectronic receiver may have at least two different operational data bandwidths are 0.8 through 1.5 Gb/s and 1.6 through 3.2 Gb/s.

With reference to the Figures, wherein like reference characters indicate like elements throughout the several views and, in particular, with reference to FIG. 1, a variable lowpass filter 10 is illustrated. As may be seen a variable capacitor 12 is disposed in parallel between the data lines $D_-$ and $D_+$. These data lines are outputs from a pre-amplifier PA1 (illustrated in FIG. 6). A resistor 14 is provided to illustrate the input impedance resistance present in post-amplifier U8 (illustrated in FIG. 6). Resistor 14 is placed in parallel with variable capacitor 12. By varying the capacitance of variable capacitor 12, one is able to adjust the cutoff frequency of low-pass filter 10 created by variable capacitor 12 and resistor 14. For example, by increasing the capacitance of variable capacitor 12, the cutoff frequency is lowered. In this manner, the frequency range of the input to post-amplifier U8 from data lines $D_-$ and $D_+$ of pre-amplifier PA1 maybe be varied. In a preferred embodiment, the value range for variable capacitor 12 and resistor 14 would be selected based on the frequencies of data lines $D_-$ and $D_+$.

Figure 2:
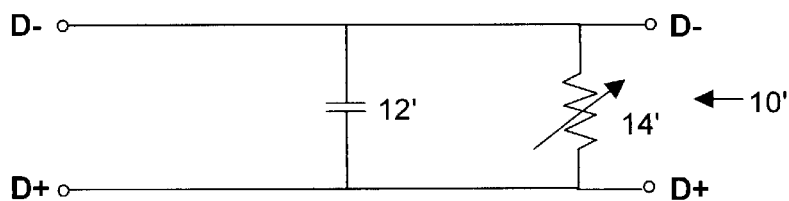
FIG. 2 is a schematic diagram of a variable resistance bandwidth switchable filter.

Turning now to FIG. 2, a schematic diagram of a variable resistance bandwidth switchable filter is illustrated. For clarity, like elements have been provided with like reference numeral except that a prime has been added to each reference numeral where there is a slight difference in the particular element in this embodiment. The following discussion will focus on the differences between the elements of this embodiment and that of the preferred embodiment.

In this embodiment, capacitor 12' is provided with a fixed value and resistor 14' is a variable resistor. By varying the resistance of variable resistor 14', one is able to adjust the cutoff frequency of low-pass filter 10' created by capacitor 12' and variable resistor 14'. For example, by increasing the resistance of resistor 14', the cutoff frequency is lowered. In this manner, the input to post-amplifier U8 may be selected from data lines $D_-$ and $D_+$ of pre-amplifier PA1.

In a preferred embodiment, the value range for capacitor 12' and variable resistor 14' would be selected based on the frequencies of data lines $D_-$ and $D_+$. It should be appreciated that in the embodiment illustrated in FIG. 1, resistor 14 may represent the resistance of post-amplifier U8. In the embodiment illustrated in FIG. 2, resistor 14' may represent the resistance of post-amplifier U8 as well as an additional variable resistance or just a variable resistance by itself.

Figure 3:
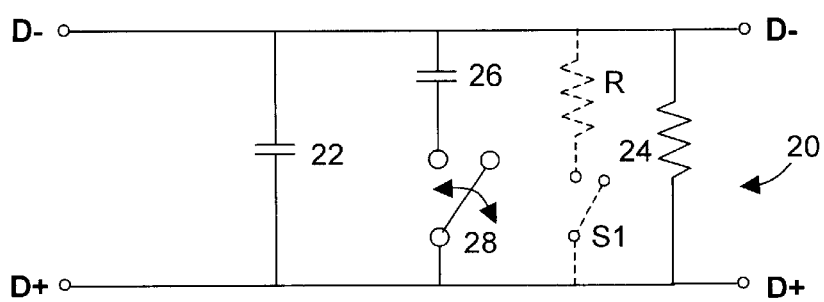
FIG. 3 is a schematic diagram of a switched capacitance bandwidth switchable filter constructed in accordance with a preferred embodiment of the invention.

Turning now to FIG. 3, a switchable lowpass filter 20 is illustrated. As may be seen, switchable lowpass filter 20 comprises a capacitor 22 having a fixed value and disposed in parallel between the data lines D and D+. A resistor 24 is disposed in parallel with capacitor 22. In a preferred embodiment, resistor 24 may represent the resistance of post-amplifier U8. The particular values for capacitor 22 and resistor 24 are selected to achieve a desired bandwidth filtering of the data on lines $D_-$ and $D_+$.

A second capacitor 26 is disposed in parallel with capacitor 22. As may been seen, a switching means 28 is provided to connect capacitor 26 in parallel with capacitor 22 when switching means 28 is closed and to remove capacitor 26 from switchable lowpass filter 20 when switching means 28 is open.

It should be appreciated that in FIG. 3, switching means 28 is illustrated by a simple single-pole switch. The teachings of the present invention may be utilized in conjunction with any switching device. Examples of switching means include, but are not limited to a single pole switch, a diode, a transistor, pin diode, and relay.

In operation, switchable lowpass filter 20 has two states: 1) corresponding to switching means 28 being open and 2) corresponding to switching means 28 being closed. When switching means 28 is open, there is infinite resistance in the branch containing capacitor 26. Thus, capacitor 26 is switched out of the circuit. In this state, the cutoff frequency for switchable lowpass filter 20 is determined by capacitor 22 and resistor 24. This cutoff frequency corresponds to the higher of the frequencies of data lines $D\_0$ and $D_+$. When switching means 28 is closed, capacitor 26 is placed in parallel with capacitor 22. This increases the capacitance of switchable lowpass filter 20. In this state, the cutoff frequency for switchable lowpass filter 20 is determined by capacitors 22, 26 and resistor 24. This cutoff frequency corresponds to the lower of the frequencies of data lines $D_-$ and $D_+$.

In this manner, the frequency content of input to post-amplifier U8 may be varied from data lines $D_-$ and $D_+$ of pre-amplifier PA1. In a preferred embodiment, the value range for capacitors 22, 26 and resistor 24 would be selected based on the frequencies of data lines $D_-$ and $D_+$.

It should be appreciated that instead of switching a capacitance 26, one would switch a resistance R into circuit 20. This is illustrated by dashed lines in FIG. 3. In this embodiment, capacitor 26 would be in parallel to resistor 24 and resistor R. Thus, the resistance in circuit 20 would be varied by closing switch S1.

Figure 4:
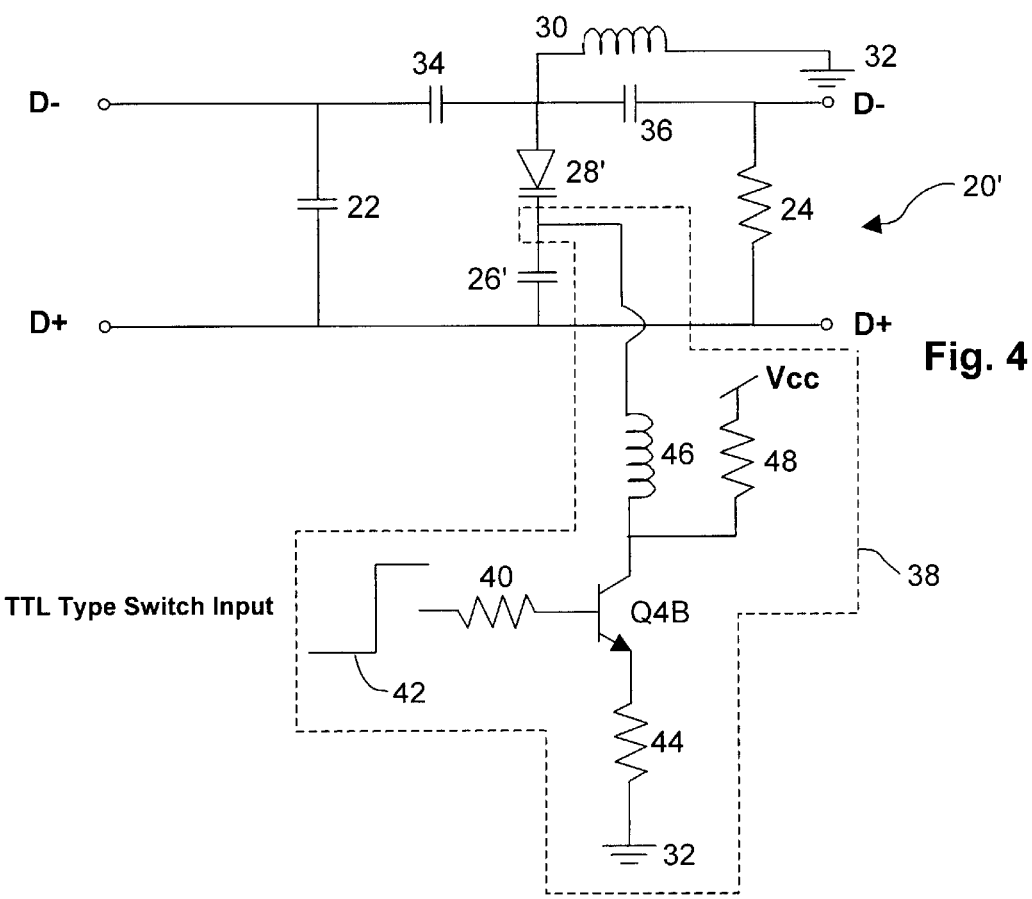
FIG. 4 is a detailed full schematic diagram of a variable capacitance bandwidth switchable filter illustrated in FIG. 1.

Turning now to FIG. 4, a schematic diagram of a variable capacitance bandwidth switchable filter 20' is illustrated. For clarity, like elements have been provided with like reference numeral except that a prime has been added to each reference numeral where there is a slight difference in the particular element in this embodiment. The following discussion will focus on the differences between the elements of this embodiment and that of the preferred embodiment.

As may be seen variable lowpass filter 20' provides more detail as to a particular switching means 28 and further modifications to switchable lowpass filter 20 to allow for faster switching between at least two frequency bands. In this embodiment, a variable capacitance diode 28' is provided with a cathode connected between the junction of capacitor 22 and resistor 24. In addition, the anode of diode 28' is connected to inductor 30 and in turn to ground 32. To operate a variable capacitance diode 28', it is necessary to vary diode 28' reverse-bias voltage, so the anode goes to ground 32. Inductor 30 keeps the high frequency data signal form being shorted to ground 32. The inductor 30 may be replaced by a resistor with value much greater than resistor 24. Disposed between capacitor 22 and the anode of diode 28' is capacitor 34. Similarly, disposed between the anode of diode 28' and resistor 24 is capacitor 36. Capacitors 34 and 36 are provided for dc isolation of variable capacitance diode 28' from post-amplifier U8 and preamp PA1. Connected to the cathode of diode 28' is an isolation capacitor 26'. Connected at a junction between capacitor 26' and diode 28' is a switching input circuit 38 that switches bias on diode 28' between two states.

Switching input circuit 38 comprises a NPN transistor Q4B. A resistor 40 is connected between the base of transistor Q4B and input 42. Another resistor 44 is disposed between the emitter of transistor Q4B and ground 32. The collector of transistor Q4B is connected between capacitor 26' and diode 28', via inductor 46. A voltage is applied to collector via resistor 48 and voltage input $V_{cc}$.

Switching input circuit 38 provides 2 distinct values of bias voltage to diode 28' in response to TTL signal 42. Resistors 48 and 44 serve to divide $V_{cc}$. When transistor Q4B is on, only a fraction of $V_{cc}$ biases diode 28'. When transistor Q4B is off, all of $V_{cc}$ reverse biases diode 28'.

In a preferred embodiment, capacitors 22, 26', 34, and 36 would have the following respective values: capacitor 22 on the order of 1 pF; capacitor 26' on the order of 0.1 $\mu$F; capacitor 34 on the order of 0.1° F.; and capacitor 36 on the order of 0.1 $\mu$F. Variable capacitance diode 28' may have capacitance values on the order of 0.5 pF when fully reverse biased and 2 pF when partially reverse biased. Similarly, inductors 30 and 46 will each have a value on the order of 1.0 $\mu$H. Resistors 24, 40, 44, and 48 will preferably have the following respective values on the order of 100 $\Omega$, 100 k$\Omega$, 10 k$\Omega$, and 10 k$\Omega$. However, inductors 30 and 46 may be resistors each having a value on the order of 1 k$\Omega$. It should be appreciated that all of the above values are nominal values and may be modified without departing from the teachings of the present invention. By selecting the above values, variable lowpass filter 20' is configured to switch between about 1 GHz and 2 GHz cutoff frequencies. It should be appreciated that any of the above values may be modified and still considered within the scope of the invention so long as the resulting circuit is capable of switching between at least two different cutoff frequencies. Also, by utilizing variable capacitance diode 28', one is able to tune the cutoff frequency by adjusting the capacitance of this device.

In operation, input voltage 42 is applied to the base of transistor Q4B. In a first instance corresponding to a high input voltage, e.g. 5V, transistor Q4B passes current such that a reverse voltage is considerably less than $V_{cc}$ is applied to the cathode of diode 28'. This causes the variable capacitance associated with diode 28' to assume the larger of its two desired values. Diode 28' functions as a variable, small value capacitor in circuit 20'. In this state, the cutoff frequency for variable lowpass filter 20' is determined by capacitor 22, resistor 24, and the capacitance of diode 28'. This cutoff frequency corresponds to the lower of the frequencies of data lines D and D+.

In the other instance, corresponding to a low input voltage, e.g. 0V, transistor Q4B has no current. Diode 28' is reverse biased by the full value of $V_{cc}$. The capacitance of diode 28' assumes the smaller of the two desired values for the capacitance of diode 28'. This cutoff frequency corresponds to the higher of the frequencies of data lines D and D+. The two states are described in the table below:

| TTL Input | Diode Capacitance | Transistor Current | Filter Bandwidth |
| --- | --- | --- | --- |
| High | High | On | Low |
| Low | Low | Off | High |

Figure 5:
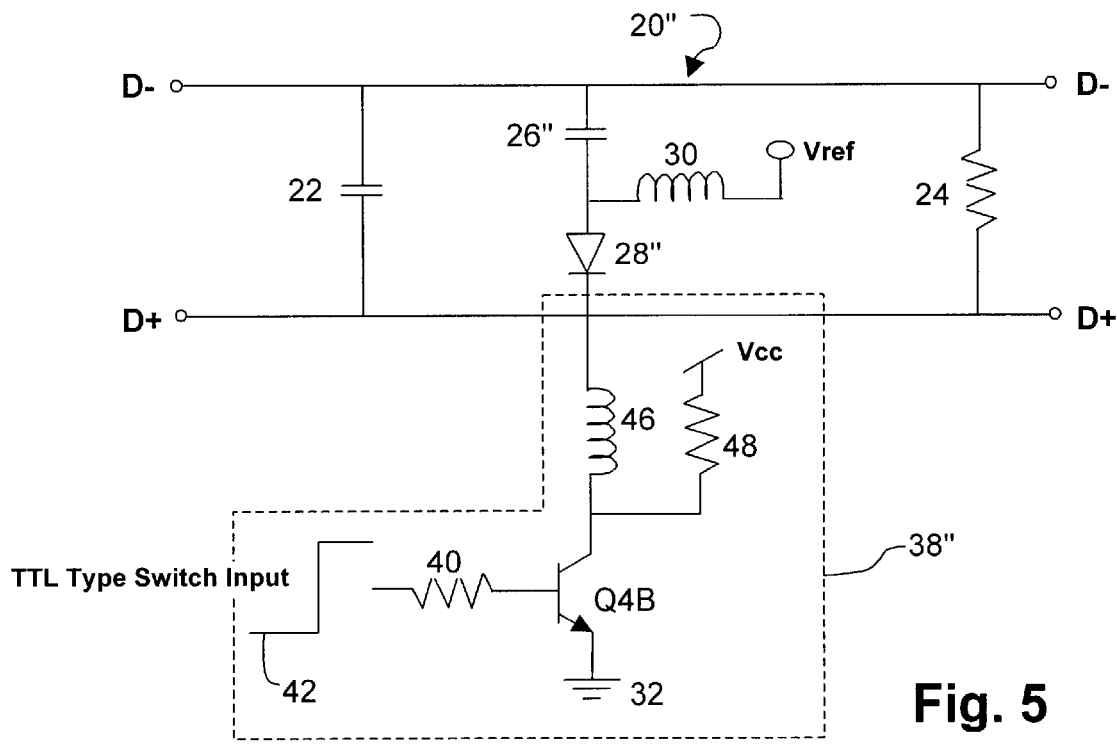
FIG. 5 is a detailed full schematic diagram of a switched capacitance bandwidth switchable filter illustrated in FIG. 3.

Turning now to FIG. 5, a schematic diagram of a switched capacitance bandwidth switchable filter 20" is illustrated.

For clarity, like elements have been provided with like reference numeral except that two primes have been added to each reference numeral where there is a slight difference in the particular element in this embodiment. The following discussion will focus on the differences between the elements of this embodiment and that of the preferred embodiment.

As may be seen switchable lowpass filter 20" provides more detail as to a particular switching means 28 and further modifications to switchable lowpass filter 20 to allow for switching between two frequency bands. Diode 28" is a variable resistance diode, a pin diode, whereas diode 28', described above, is a variable capacitance diode. Capacitor 26', as shown in FIG. 4 has a large value. As shown in FIG. 5, capacitor 26" has a low value and defines filter bandwidth. In this embodiment, a pin diode 28" is provided with a cathode connected between the junction of capacitor 22 and resistor 24. In addition, the anode of diode 28" is connected to inductor 30 and in turn to $V_{ref}$. $V_{ref}$ is a convenient voltage between $V_{cc}$ and ground. Capacitor 26" may have a low value such as 1 pF. Inductor 30 provides ac isolation to diode 28" and may be replaced with a nominal 1 kΩ resistor. Disposed between capacitor 22 and the anode of diode 28" is capacitor 26". In this embodiment, capacitor 26" is switched into and out of lowpass filter 20". Connected to the cathode of diode 28" is a switching input circuit 38" for switching capacitor 26".

Switching input circuit 38" comprises a NPN transistor Q4B. A resistor 40 is connected between the base of transistor Q4B and input 42. Resistor 40 limits the base current in transistor Q4B. The emitter of transistor Q4B is connected to ground 32. The collector of transistor Q4B is connected to the cathode of diode 28", via inductor 46 for ac isolation. A voltage is applied to collector via resistor 48 and voltage input $V_{cc}$.

Resistor 48 serves a very important purpose in switchable lowpass filter 20". When transistor Q4B is off, diode 28" should be reverse biased. If diode 28" is not reversed biased, it will have a capacitance of many picofarads that in turn will make diode 28" look like a low impedance device. Thus, by providing resistor 48, one is able to reverse bias diode 28" and thus remove the stray capacitance from diode 28".

In a preferred embodiment, capacitors 22 and 26 each will have values on the order of 1 pF. Similarly, inductors 30 and 46 each will have each have respective values on the order of about 1 μH. Inductors 30 and 46 may also be resistors each having a value of about 1 kΩ. Resistors 24 and 40 will have respective values of 100 Ω and 100 kΩ. Resistor 48 may have a value of about 10 kΩ. It should be appreciated that all of the above values are nominal values and may be modified without departing from the teachings of the present invention. By selecting the above values, variable lowpass filter 20' is configured to switch between about 1 GHz and about 2 GHz cutoff frequencies. It should be appreciated that any of the above values may be modified and still considered within the scope of the invention so long as the resulting circuit is capable of switching between at least two different cutoff frequencies.

In operation, input voltage 42 is applied to the base of transistor Q4B. In a first instance corresponding to a TTL low input voltage, e.g. 0V, both diode 28" and transistor Q4B have little to no current, diode 28" is open. This causes capacitor 26 to be switched out of switchable lowpass filter 20". In this state, the cutoff frequency for switchable lowpass filter 20" is determined by capacitor 22 and resistor 24, the input resistor of post-amplifier U8. This cutoff frequency corresponds to the higher of the frequencies of data lines $D_-$ and $D_+$.

In the other instance, corresponding to a TTL high input voltage, both diode 28ƒ and transistor Q4B have current, i.e., diode 28" is closed. When diode 28" is closed, capacitor 26 is placed in parallel with capacitor 22. This increases the capacitance of switchable lowpass filter 20". In this state, the cutoff frequency for switchable lowpass filter 20" is determined by capacitors 22, 26" and resistor 24. This cutoff frequency corresponds to the lower of the frequencies of data lines $D_-$ and $D_+$. The two states are described in the table below:

| TTL Input | Diode Current | Transistor Current | Switching Means | Filter Bandwidth |
| --- | --- | --- | --- | --- |
| Low | Off | Off | Open | High |
| High | On | On | Closed | Low |

Figure 6:
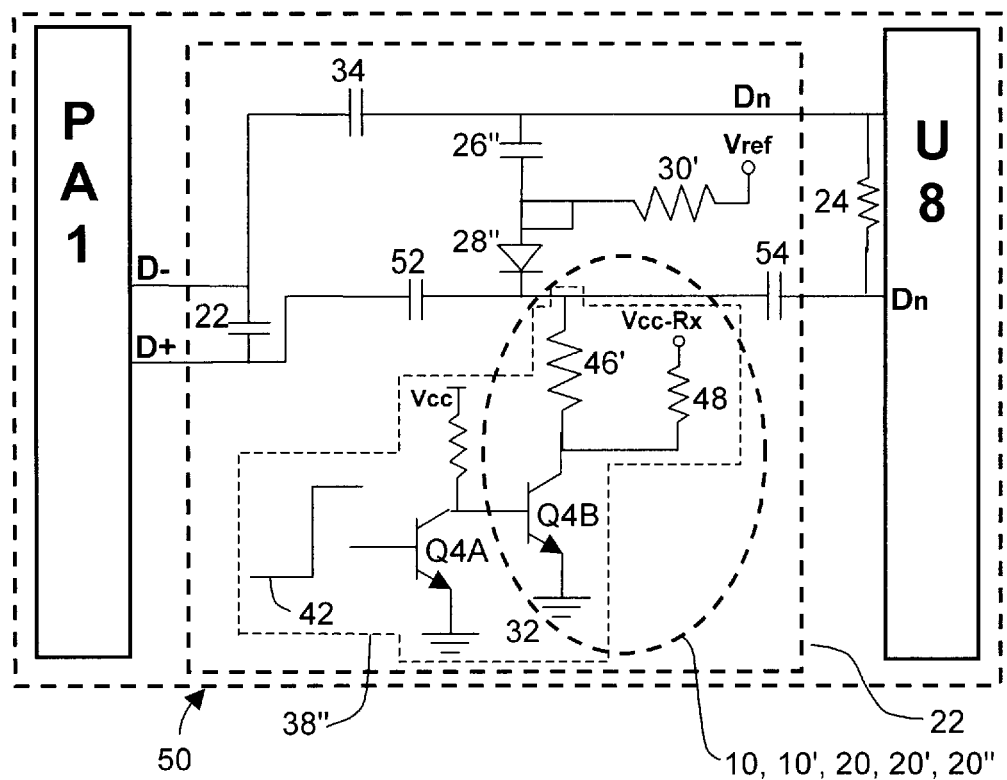
FIG. 6 is a schematic diagram of a receiver section that utilizes the switched capacitance bandwidth switchable filter illustrated in FIGS. 1 through 5.

Turning now to FIG. 6, a schematic diagram of a receiver section 50 that utilizes the switched capacitance bandwidth switchable filter illustrated in FIGS. 1, 2, 3, 4 and 5 is illustrated. The receiver is capable of receiving data at two different data rates or frequencies on lines D and D+ in FIG. 6. As may be seen by the dashed lines, the electronic elements enclosed may be replaced by the lowpass filters illustrated as 10, 10', 20, 20' and 20". In addition, the lowpass filter illustrated in FIG. 6 is a slight modification of filter 20". We will now discuss this filter, below.

As may be seen switchable lowpass filter provides more detail as to a particular switching means 28 and further modifications to switchable lowpass filter to allow for switching between two frequency bands. In this embodiment, a pin diode 28" is provided with a cathode connected between the junction of capacitor 22 and resistor 24. In addition, the anode of diode 28" is connected to resistor 30' and in turn to $V_{ref}$. Disposed between capacitor 22 and the anode of diode 28" are capacitors 26" and 34. In this embodiment, capacitor 26" is switched into and out of the lowpass filter. Isolation capacitors 34, 52 and 54 are provided to isolate diode 28" from post-amplifier U8 and preamp PA1. Connected to the cathode of diode 28" is a switching input circuit 38" for switching capacitor 26".

Switching input circuit 38" comprises a NPN transistor Q4B. A second NPN transistor Q4A is disposed between the base of transistor QB4 and input 42. Transistor Q4A inverts the logic of the filter to meet required standard. The emitter of transistor Q4B is connected to ground 32. The collector of transistor Q4B is connected to the cathode of diode 28", via resistor 46'. A voltage is applied to collector via resistor 48 and voltage input $V_{cc}$-$R_x$.

Resistor 48 serves the same purpose as described in the other embodiments, above.

In a preferred embodiment, capacitors 22, 26", 34, 52 and 54 will have the following respective values: 1 pF, 2 pF, 0.1 μF, 0.1 μF, and 0.1 μF, respectively. Similarly, resistors 24, 30', 46' and 48 will have the following respective values 100 Ω, 1.3 kΩ, 1.3 kΩ, and 10.0 kΩ. It should be appreciated that all of the above values are nominal values and may be modified without departing from the teachings of the present invention. By selecting the above values, switchable lowpass filter is configured to switch between about 1 GHz and about 2 GHz cutoff frequencies. It should be appreciated that any of the above values may be modified and still considered within the scope of the invention so long as the resulting circuit is capable of switching between at least two different cutoff frequencies. Also, by varying the values of capacitors 22 and 26", one is able to tune the cutoff frequency.

This device functions as described above. It should be appreciated that by utilizing the lowpass filters illustrated as 10, 10', 20, 20' and 20", one is able to dynamically select between two different data rates or frequencies as represented by $D_-$ and $D_+$.

Figure 7:
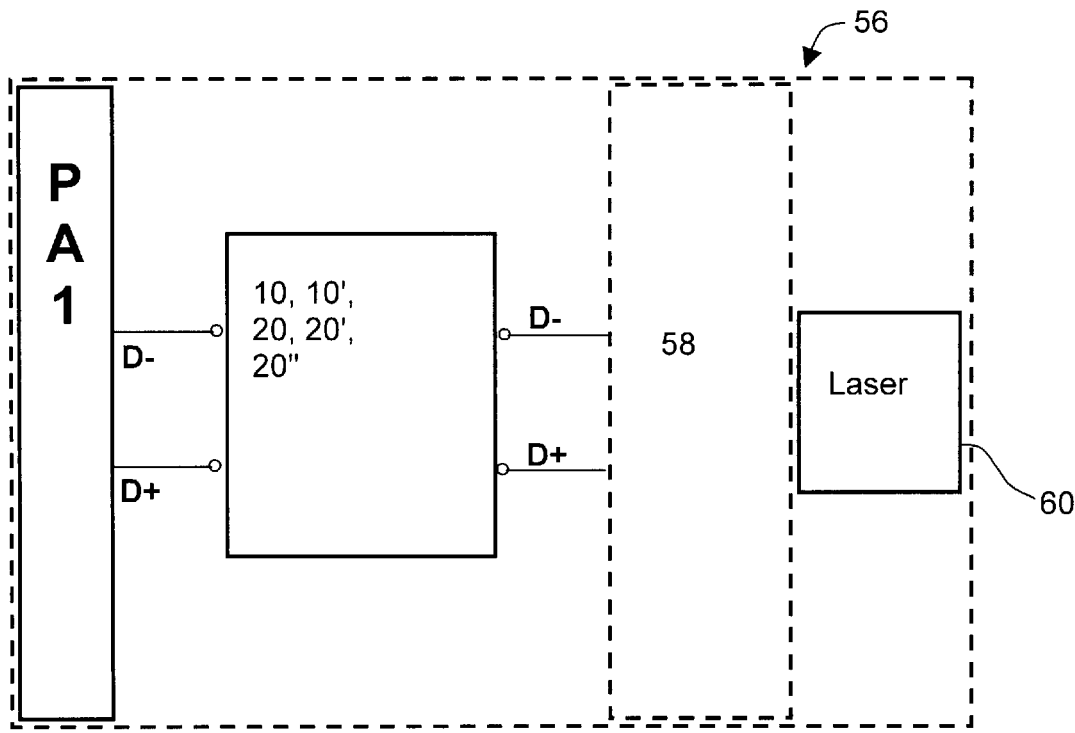
FIG. 7 is a schematic diagram of a transmitter section that utilizes the switched capacitance bandwidth switchable filter illustrated in FIGS. 1 through 5.

Turning now to FIG. 7, a schematic diagram of a transmitter section 56 that utilizes the switchable bandwidth filters illustrated in FIGS. 1 through 5 is illustrated. As may be seen by the dashed box, the electronic elements enclosed may be replaced by the lowpass filters illustrated as 10, 10', 20, 20' and 20". In addition, an optional post-amplifier 58, similar to U8, may be incorporated into the transmitter section 56. The output from the lowpass filter is sent to a laser 60, which in turn emits with a bandwidth as determined by the low pass filter. In a preferred embodiment, laser 60 would be a vertical cavity surface emitting laser (VCSEL).

Figure 8:
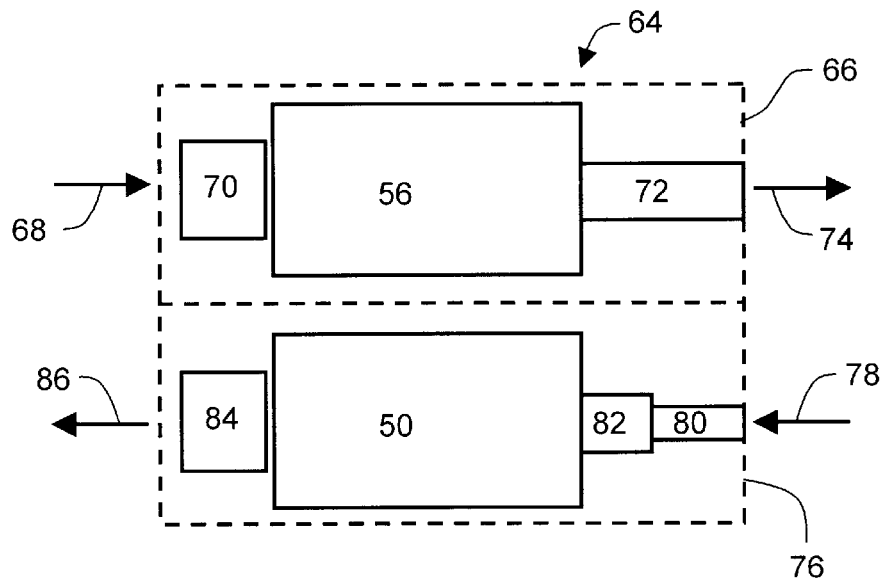
FIG. 8 is a block diagram of the optoelectronic transmitter of FIG. 7 and the optoelectronic receiver of FIG. 6, which, if combined, form an optoelectronic transceiver.

Turning now to FIG. 8, a block diagram showing the functioning of an optoelectronic transceiver 64 which includes an optoelectronic transmitter 66, and an optoelectronic receiver 76. An electrical input signal 68 is transferred by an electrical connector 70 to a transmitter section 56 which converts electrical input signal 68 to an optical output signal 74, e.g. via a laser 60. Transmit optical subassembly 72 guides the optical output signal 74 into a useful transmission medium such as an optical fiber (not shown). An example of an optical subassembly may be found in U.S. application Ser. No. 09/323,204, entitled "Electro-Opto-Mechanical Assembly for Coupling a Light Source or Receiver to an Optical Waveguide," filed Jun. 1, 1999. This application is hereby incorporated by reference. The conversion of electrical input signal 68 to optical output signal 74 is the primary function of electrical transmitter 66.

The conversion of optical input signal 78 to an electrical output signal 86 is the primary function of optoelectronic receiver 76. Optical input signal 78 is coupled by receive optical subassembly 80 and to a photodetector 82 which converts optical input signal 78 to an electric signal (not shown). An example of an optical subassembly may be found in U.S. application Ser. No. 09/323,204, entitled "Electro-Opto-Mechanical Assembly for Coupling a Light Source or Receiver to an Optical Waveguide," filed Jun. 1, 1999. This application is hereby incorporated by reference. Optoelectronic receiver section 50 amplifies the electric signal (not shown) to make the electric signal suitable as an electrical output signal 86, after transfer through electrical connector 84.

Transmitter 66 and receiver 76 have other features such as electrical power supply, ground, and mechanical mounts that are not shown. FIG. 8 illustrates only the main functional features of transmitter 66 and receiver 76. Often, transmitter 66 and receiver 76 are combined in a single housing, and the resulting component is optoelectronic transceiver 66. An example of a transmitter and receiver housing may be found in U.S. application Ser. No. 09/389,220, entitled "Enclosure for Optical Subassembly Having Mechanical Alignment Features," filed Sep. 3, 1999. This application is hereby incorporated by reference.

While the prior embodiments have utilized a resistor to bias the anode of the diode in the switch, it should be appreciated that an inductor may be used in place of the illustrated resistor. It may be seen that in the embodiment illustrated in FIG. 6, resistors and inductors are interchangeable in this application, so long as appropriate values are selected. The key feature of the device used for the resistor is that an impedance be provided to isolate the switched diode from its biasing circuitry.

Figure 9:
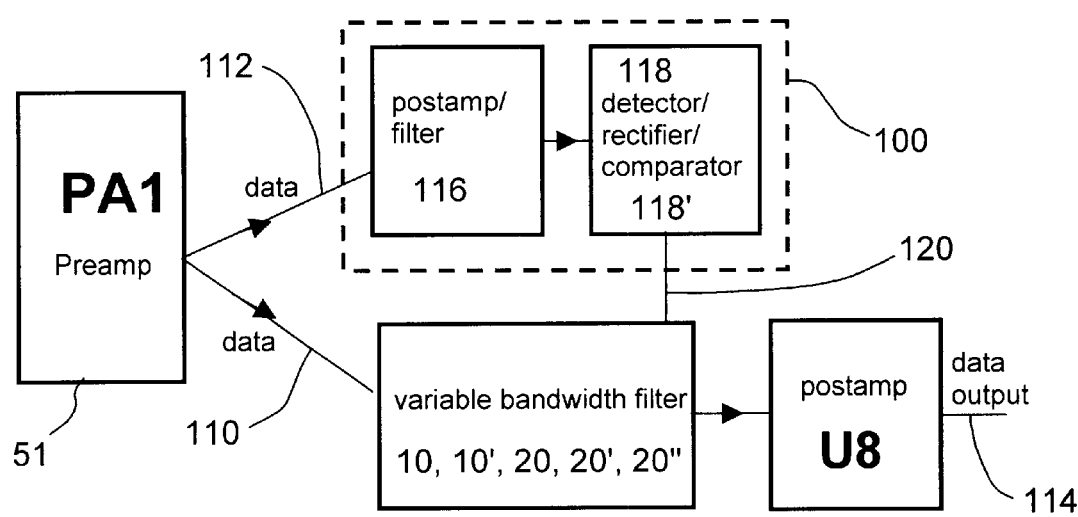
FIG. 9 is a block diagram of an autodetection circuit used in combination with the teaching of the invention illustrated in FIGS. 1 through 8.

It should be appreciated that in the present invention an autodetecting circuit may be used to control TTL input 42 of the present invention. For example, as shown in FIG. 9, in such an autodetecting circuit 100, preamp 51's output may be split into 2 paths: a lower path 110 driving BW filter 10, 10', 20, 20' and/or 20" and postamp U8, described above, and producing data output 114. An upper path 112 is provided for driving autodetection circuitry 100 including an upper postamp/filter 116 and a detector/rectifier 118. Upper postamp 116 amplifies preamp 51 output to a fixed voltage swing (preamp 50's output swing varies with optical input level), then filters it. The filter in element 116 may be a lowpass, highpass, bandpass or band reject filter and has frequency characteristics such that its output swing will be markedly different, depending on whether data is at 1 Gb or 2 Gb, for example. While postamp 116 and Postamp U8 are illustrated as separate components, it should be appreciated that postamp 116 could be the same as postamp U8, or could be a simplified version. The function of postamp 116 is produce a fixed ac output swing when presented with varying ac input swing and any element that provides this feature may be used for postamp 116.

Detector 1118, preferably a rectifier, converts ac output of filter 116 to a dc signal used to control BW filter 10, 10', 20, 20', 20". The Comparator in element 116 converts the dc signal to logic level, for example, comparator output would be high if data were at 2 Gb and low if data were at 1 Gb. For comparator to work properly, its input (from the detector) must have been derived from an ac swing of known amount. This is why it is important that a fixed voltage swing from postamp 116 is stressed above. The output from block 118 is a control signal 120. It should be appreciated that the function of detector/rectifier and comparator 118 is very common and may be implemented in many different ways. Therefore, the particular circuitry is not of importance but the functional result is of importance to the invention. While blocks 116 and 118 are illustrated as separate elements, it should be appreciated that they may be integrated into a single block, so long as the functionality is maintained.

It should be appreciated that if one places filter/detector 118 to the right of postamp U8, thereby eliminating postamp 116, the entire circuit would then 'latch up', i.e., once it has detected 1 Gb data and set the variable BW filter for 1 Gb, then it would subsequently never allow 2 Gb data to pass. This means that it would never be able to switch itself to the 2 Gb state, having once switched to the 1 Gb state. This is why 2 independent data paths 110, 112 are essential in the present circuit.

Control signal 120 is typically TTL, as in the present application. BW filter may be circuits 10, 10' 20, 20' or 20", as discussed above.

A digital autodetection system would be very much the same as the previous (analog) autodetector described above. The exception is that we now differentiate between the 1 Gb and 2 Gb data streams, based not on their analog properties (energy content as a function of frequency), but based on their digital properties, as defined by the encoding used in Fiber Channel or Gigabit Ethernet.

The Fiber Channel uses an 8B/10B code. For this discussion, the important property of this code is that it frequently has runs of Consecutive Identical Digits of length 5, but never greater than 5. In other words, expect to see 5 ones or 5 zeros in a row very frequently, but never a run of 6 or longer. This fact can be used to differentiate between 1 Gb and 2 Gb as follows.

Upper postamp 116 serves to amplify preamp PA 1 output 112 to a standard logic level, so that it can then be processed by digital circuitry 118' (the digital detector). Digital detection block 118' in the diagram will count consecutive identical data bits coming from postamp 116. The data bits are within a 8B/10B encoded data stream. The data stream contains a maximum of 5 CIDs. It should be appreciated that you get a count of 10 because 5 consecutive ones at 1 Gb look like 10 consecutive ones when you are counting them at twice the speed at which they arrive, i.e., you count each of the ones two times. It will assume data rate to be 2 Gb in doing its count. Circuitry involved in block 118 is very simple. If the counter reaches a max of '5', the data is at 2 Gb; if it reaches a max of '10', the data is at 1 Gb. While we have discussed detection block 118' as being digital, it should be appreciated that an analog equivalent may be utilized in its place.

It should be appreciated that blocks 116 and 118' may be subdivided in quite a number of ways, or even be collapsed into a single IC. In addition, there may be other properties of the 8B/10B encoded data that could be exploited for detection of data rate. Additionally, there may details that could be added to a practical digital detector, to ensure that an occasional miscount did not falsely set the switchable filter. Finally, it is preferable that the digital detector will have to have some sort of 2 GHz clock input supplied to it. This clock need not be synchronous with the data or even very accurate and could thus be generated within the digital detector. It should be appreciated that a clock input may not be needed since the circuit is only trying to differentiate between 5 bits and 10 bits.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A switchable optoelectronic receiver having at least two different operational data bandwidths and a switchable lowpass filter for selecting between said two bandwidths, wherein said switchable lowpass filter comprises parallel elements and a switching element, said parallel elements comprising a first capacitor and a resistor, said resistor being in parallel with said first capacitor; said switching element comprising at least a second capacitor and switching means, said second capacitor disposed parallel to said first capacitor when said switching means is engaged.

2. The switchable optoelectronic receiver recited in claim 1, wherein said switching means comprises a diode.

3. The switchable optoelectronic receiver recited in claim 1, wherein said switching means is selected from the group consisting of single-pole switches, diodes, transistors, pin diodes, and relays.

4. The switchable optoelectronic receiver recited in claim 1, wherein said switching means and said second capacitor are combined.

5. The switchable optoelectronic receiver recited in claim 4, wherein said switching means comprises a variable capacitance diode.

6. The switchable optoelectronic receiver recited in claim 1, wherein said switchable lowpass filter is a variable capacitance lowpass filter.

7. The switchable optoelectronic receiver recited in claim 1, wherein said switchable lowpass filter is a variable resistance lowpass filter.

8. The switchable optoelectronic receiver recited in claim 1, further comprising a switching input circuit for controlling said switchable lowpass filter.

9. The switchable optoelectronic receiver recited in claim 1, wherein said at least two different operational data bandwidths are 0.8 through 1.5 Gb/s and 1.6 through 3.2 Gb/s.

10. The switchable optoelectronic receiver recited in claim 1, wherein said at least two different operational data bandwidths are 1.0625 Gb/s±100 ppm and 2.125 Gb/s±100 ppm.

11. The switchable optoelectronic receiver recited in claim 1, further comprising means for autodetecting said operational data bandwidth.

12. The switchable optoelectronic receiver recited in claim 11, wherein said autodetecting means provides a control signal to said means for selecting between said two bandwidths.

13. The switchable optoelectronic receiver recited in claim 11, wherein said means for autodetecting comprises a first and second data channel, said first data channel input to said means for selecting between said two bandwidths, said second data channel input to a post-amplifier and filter and then to a detector/rectifier/comparator to generate a control signal, said control signal provided to said means for selecting between said two bandwidths.

14. The switchable optoelectronic receiver of claim 1, further comprising means for autodetecting said operational data bandwidth, wherein said means for autodetecting comprises a first and second data channel, said first data channel providing input to said switchable lowpass filter, and said second data channel providing input to a post-amplifier and filter and then to a detector/rectifier/comparator to thereby generate a control signal, wherein said control signal is provided to said switchable lowpass filter.

15. A switchable optoelectronic transceiver having at least two different operational bandwidths and switchable lowpass filter for selecting between said two bandwidths, wherein said switchable lowpass filter comprises parallel elements and a switching element, said parallel elements comprising a first capacitor and a resistor, said resistor being in parallel with said first capacitor; said switching element comprising at least a second capacitor and switching means, said second capacitor disposed parallel to said first capacitor when said switching means is engaged.

16. The switchable optoelectronic transceiver of claim 15, wherein said transceiver includes a switchable optoelectronic transmitter shaving said at least two different emission bandwidths, and wherein said transmitter includes said switchable lowpass filter for selecting between said two bandwidths.

17. The switchable optoelectronic transceiver recited in claim 16, wherein said switching means comprises a diode.

18. The switchable optoelectronic transceiver recited in claim 16, wherein said switching means is selected from the group consisting of single-pole switches, diodes, transistors, pin diodes, and relays.

19. The switchable optoelectronic transceiver recited in claim 16, wherein said switching means and said second capacitor are combined.

20. The switchable optoelectronic transceiver recited in claim 19, wherein said switching means comprises a variable capacitance diode.

21. The switchable optoelectronic transceiver recited in claim 16, wherein said switchable lowpass filter comprises a variable capacitance lowpass filter.

22. The switchable optoelectronic transceiver recited in claim 16, wherein said switchable lowpass filter comprises a variable resistance lowpass filter.

23. The switchable optoelectronic transceiver recited in claim 16, further comprising a switching input circuit for controlling said means for selecting between said two bandwidths.

24. The switchable optoelectronic transceiver recited in claim 23, wherein said switching means comprises a diode.

25. The switchable optoelectronic transceiver recited in claim 23, wherein said switching means is selected from the group consisting of single-pole switches, diodes, transistors, pin diodes, and relays.

26. The switchable optoelectronic transceiver recited in claim 23, wherein said switching means and said second capacitor are combined.

27. The switchable optoelectronic transceiver recited in claim 26, wherein said switching means comprises a variable capacitance diode.

28. The switchable optoelectronic transceiver recited in claim 23, further comprising a switching input circuit for controlling said switchable lowpass filter.

29. The switchable optoelectronic transceiver recited in claim 23, wherein said switchable lowpass filter comprises a variable capacitance lowpass filter.

30. The switchable optoelectronic transceiver recited in claim 23, wherein said switchable lowpass filter comprises a variable resistance lowpass filter.

31. The switchable optoelectronic transceiver recited in claim 16, wherein said at least two different operational data bandwidths are 0.8 through 1.5 Gb/s and 1.6 through 3.2 Gb/s.

32. The switchable optoelectronic transceiver recited in claim 16, wherein said at least two different operational data bandwidths are 1.0625 Gb/s±100 ppm and 2.125 Gb/s±100 ppm.

33. The switchable optoelectronic transceiver recited in claim 16, further comprising means for autodetecting said operational data bandwidth.

34. The switchable optoelectronic transceiver recited in claim 33, wherein said autodetecting means provides a control signal to said means for selecting between said two bandwidths.

35. The switchable optoelectronic receiver recited in claim 33, wherein said means for autodetecting comprises a first and second data channel, said first data channel input to said means for selecting between said two bandwidths, said second data channel input to a post-amplifier and filter and then to a detector/rectifier/comparator to generate a control signal, said control signal provided to said means for selecting between said two bandwidths.

36. The switchable optoelectronic transceiver recited in claim 15, wherein said at least two different operational data bandwidths are 0.8 through 1.5 Gb/s and 1.6 through 3.2 Gb/s.

37. The switchable optoelectronic transceiver recited in claim 15, wherein said at least two different operational data bandwidths are 1.0625 Gb/s±100 ppm and 2.125 Gb/s±100 ppm.

38. The switchable optoelectronic transceiver recited in claim 15, further comprising means for autodetecting said operational data bandwidth.

39. The switchable optoelectronic transceiver recited in claim 38, wherein said autodetecting means provides a control signal to said means for selecting between said two bandwidths.

40. The switchable optoelectronic transceiver recited in claim 38, wherein said means for autodetecting comprises a first and second data channel, said first data channel input to said means for selecting between said two bandwidths, said second data channel input to a post-amplifier and filter and then to a detector/rectifier/comparator to generate a control signal, said control signal provided to said means for selecting between said two bandwidths.

41. The switchable optoelectronic transceiver of claim 16, further comprising means for autodetecting said operational data bandwidth, wherein said means for autodetecting comprises a first and second data channel, said first data channel providing input to said switchable lowpass filter, and said second data channel providing input to a post-amplifier and filter and then to a detector/rectifier/comparator to thereby generate a control signal, wherein said control signal is provided to said switchable lowpass filter.

42. The switchable optoelectronic transceiver of claim 15, further comprising means for autodetecting said operational data bandwidths, wherein said means for autodetecting comprises a first and second data channel, said first data channel providing input to said a switchable lowpass filter, and said second data channel providing input to a post-amplifier and filter and then to a detector/rectifier/comparator to thereby generate a control signal, wherein said control signal is provided to said switchable lowpass filter.

* * * * *